FIG. I

INVENTOR
TERENCE MARTIN EULING
BY Cushman, Darby & Cushman
ATTORNEYS

Nov. 16, 1965     T. M. EULING     3,217,359
APPARATUS FOR THERMOPLASTIC FILM MANUFACTURE
Filed Feb. 9, 1962     2 Sheets-Sheet 2

INVENTOR
TERENCE MARTIN EULING

BY Cushman, Darby & Cushman
ATTORNEYS though it may be preferable in some embodiments to supply both sides of the baffle or locator with air from a separate source or sources. Such separate source or sources may be one or more pumps taking air from the atmosphere.

United States Patent Office 3,217,359
Patented Nov. 16, 1965

3,217,359
APPARATUS FOR THERMOPLASTIC
FILM MANUFACTURE
Terence Martin Euling, Welwyn Garden City, England, assignor to Imperial Chemical Industries Limited, London, England, a corporation of Great Britain
Filed Feb. 9, 1962, Ser. No. 172,309
Claims priority, application Great Britain, Feb. 10, 1961, 5,015/61
1 Claim. (Cl. 18—14)

This invention relates to a tubular apparatus for the production of biaxially oriented thermoplastic film.

Processes have been described for orienting tubular thermoplastic film by "blowing" or inflation of the tube at a temperature suitable for orientation usually below the melting point of the thermoplastic. In such processes, for instance, a tube of thermoplastic may be melt extruded from a die, quenched in a cooled "sizing die" or in a waterbath, passed between take off nip rollers, then inflated by gaseous pressure to stretch it laterally and longitudinally to biaxially orient it and finally hauled off by "draw nip rollers" which supply some of the longitudinal stretching tension and seal off the tube against escape of the inflating gas.

I have precieved the need for apparatus in which the "take off nip rollers" are not used. The object of the invention is to provide such apparatus.

The invention provides a tubular apparatus for the production of biaxially oriented thermoplastic film wherein a tube of thermoplastic is extruded from an extrusion die in association with which are means to prevent an inflation pressure from rupturing the tube, any volatile liquids are evaporated off and/or the tube is cooled either before or after emerging from the body of the equipment containing the extrusion die whereby the tube is rendered non-sticky as hereinafter defined, after which the rate of feed of the tube is controlled by passing it through a feed control means having speed controlled moving surfaces which surround at least partially and grip the tube over a portion of its length without flattening it to feed it positively, thereby retarding the passage of the tube in opposition to the longitudinal stretching force (or overcoming friction in the sizing die) and preventing it from being pulled uncontrollably away from the die; the tube is heated, if necessary, to adjust its temperature to that suitable for orienting the thermoplastic; and the tube is then inflated by gaseous pressure and longitudinally hauled off at a rate greater than that at which it is fed thereby to stretch and biaxially orient it.

The invention also provided an apparatus for a tubular process of producing oriented thermoplastic film comprising a die for extrusion of a tube having within it a passage for the supply of an inflating gas to within the tube and associated with the die a means for preventing an inflation pressure from rupturing the tube, means to evaporate off from the tube any volatile liquid and/or to cool the tube, mounted round the axis of the die but spaced axially from it a feed control means as hereinafter defined, and mounted on the axis of the die and feed control means but beyond the latter a means for hauling off a tube of film produced by inflation of the tube while trapping the inflating gas within it.

"Non-sticky" is defined as being sufficiently so, for that part of the tube which comes into contact with the moving surfaces of the feed control means not to stick to it or be marred by it. By positively feeding the tube is meant feeding it without slip between the tube and the moving surfaces. By positively driving the moving surfaces referred to below is meant driving the moving surfaces without slip.

The feed control means constructed to carry out the above defined processes and for use in the above defined apparatus is defined as comprising at least two moving surfaces constructed to surround at least partially and grip a tube over part of its length but not to scratch, flatten mar or permanently distort it, and a speed control operatively connected with the moving surfaces to control their speed so that a tube may positively be fed by the feed control means at a controlled rate. Preferably the parts of the moving surfaces which contact the tube are of a yieldable material, such as rubber.

The speed control preferably comprises external driving or driven means which is positively connected to the moving surfaces, for instance a speed controlled electric motor which is preferably coupled through worm reduction gearing. When the apparatus is in operation, the logitudinal stretching force applied to the tube will urge along the moving surfaces and such speed controlled electric motor will be acting as a brake. On start up the motor will supply power to feed the tube. The speed control may however be a brake which is adjustable to provide the desired control.

Preferably the moving surfaces comprise at least two endless belts constructed and arranged to present longitudinal gripping surfaces for the tube. To get an increased friction between the tube and such endless belts without unduly distorting the tube, it is preferred to provide each endless belt with a longitudinal channel into which the tube may be fitted. Naturally however each such channelled belt may be replaced by two or more independent belts (i.e. independent in the sense that they are not parts of a single belt). A further preference is that the parts of the endless belts which contact the tube consist of foam rubber.

Alternatively the moving surfaces comprise a number of rollers, the number, construction and arrangement of which is such that the tube may be fed positively by them (i.e. without slipping). Preferably each roller is cylindrical so that it has susbtantially the same angular velocity along its length when not greatly compressed. To increase grip, it may be surfaced with foam rubber.

The means to prevent the tube from being ruptured by the inflation fluid pressure may comprise an external solid support such as a tube. For instance the tube may be extruded as a solid from an evaporatively cooled die according to British specification No. 820,620. An alternative when a sizing die is used to cool the tube is to have the opening of the sizing die so close to the extrusion die lips that the pressure difference between the inside and outside of the tube does not rupture it.

The said means may also comprise means to surround the tube issuing from the extrusion die with a gas at a pressure near to or equal to that inside the tube so that undue inflation does not take place.

The said means may, further, comprise a baffle constructed so that it can be inserted into the tube at a position in advance of where the tube stretches, which baffle is constructed to form a seal with the tube and isolate the inflation pressure from the pressure inside the tube near to the die, in combination with a pipe through which the inflation gas pressure at the region of inflation may be adjusted.

The baffle or the locator referred to hereafter may comprise an internal air bearing. For instance it may be formed from a cylinder of sintered metal, to the interior of which air is supplied under pressure. The cylinder is inserted into the tube to form a small gap between it and the tube and provides a frictionless guide in addition to a pressure seal. Means are then provided to adjust the gas pressure on either side of the baffle or locator as desired. Conveniently such means may comprise pipes leading from the die to both sides of the baffle or locator.

The apparatus of the invention is particularly useful in operation on a tube which has been melt extruded and, more particularly, where after melt extrusion it is quenched. It could, however, be applied to tubes which have been extruded from a solution or dispersion of the thermoplastic in a volatile liquid and the volatile liquid is evaporated off. It could also be applied to a tube which has been melt extruded and then allowed to cool without quenching to below a temperature at which the tube is sticky.

When a sizing die is used to cool the tube, the internal pressure near the die is preferably somewhat above the external pressure, thereby providing improved sizing.

Preferably, for ease of operation, after passage through the feed control means, the tube is heated to orientation temperature by means of radiation, e.g. infra-red radiation. More preferably, for better control of such heating, the radiation is supplied in two stages, most of the heat being supplied from a first radiant heater e.g. an infra-red heater whereupon the heat supplied is allowed to become more evenly distributed throughout the layers of the tube which are heated, and the tube is heated to the orientation temperature by heat supplied from a second radiant heater spaced apart from the first.

A further preferred method of heating, which had the advantage of allowing the use of a more compact apparatus and permits more uniform heating, is to supply the heat for orientation from two radiant heaters, one surrounding the tube and the other centrally inside it. Thus the radiation heating means comprises an external radiant heater which surrounds the tube, and an internal radiant heater which is centrally mounted within the tube and is attached to a support extending from the die. Preferably the internal radiant heater is provided with a locator mounted on the support near to the heater, which locator is constructed to be capable of lightly contacting the internal wall of the tube. The locator improves the centering of the internal heater to reduce eccentric heating effects.

Operation of the apparatus according to the invention will now be described by way of example.

Figure 1:
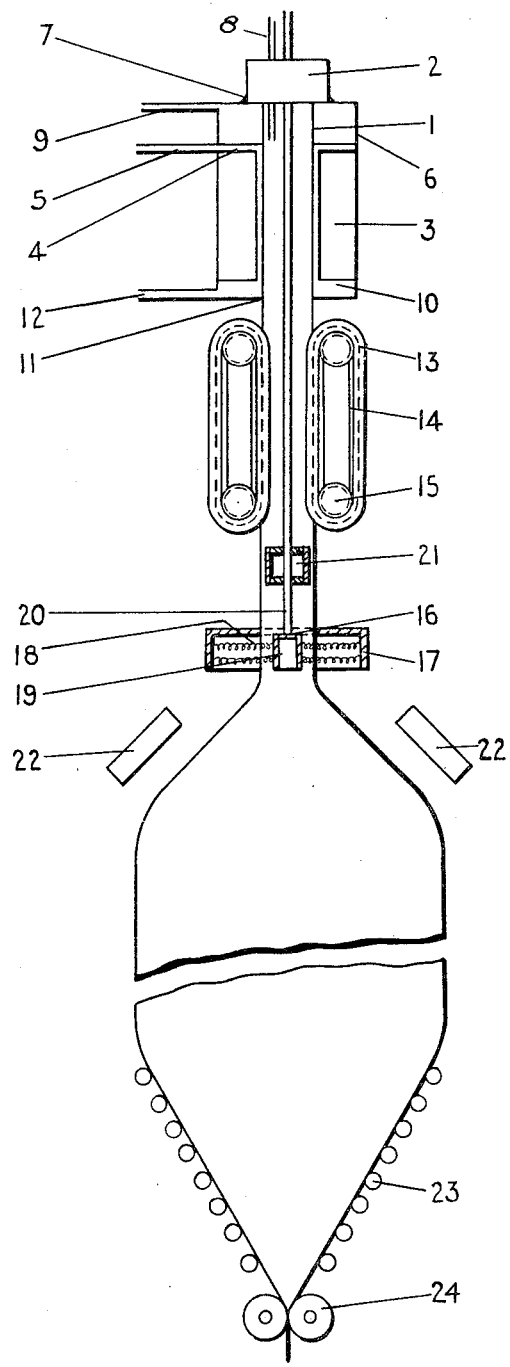
FIGURE 1 is a partly diagrammatic and partly sectional elevation of a film making system in which a tube is downwardly extruded.

In FIGURE 1, a tube of thermoplastic is melt extruded from a die 2, is passed through a sizing die 3 internally cooled (by means not shown) and lubricated by water 4, supplied from a pipe 5. The space surrounding the tube 1 between the die 2 and sizing die 3 is enclosed by a housing 6 attached to the die by a thermal insulator 7. Inflating pressure is supplied to the tube through a pipe 8 and a pipe 9 supplies a somewhat lower pressure to the housing 6. (To aid start up controlling means are preferably provided to maintain a constant pressure difference between the inside and outside of the tube.) The lower end of the sizing die 3 is provided with a vacuum suck-off device 10 having a rubber diaphragm 11 which makes a seal against the tube. Vacuum is applied to the suck-off device 10 via a pipe 12. The purpose of the suck-off device is to remove any water lubricant supplied above the sizing die and to increase the sizing pressure at the bottom of the sizing die.

Beyond the sizing die 3 the tube 1 is gripped by a feed control means comprising longitudinally V grooved and continuous foam rubber endless belts 13 carried by hard rubber or fabric belts 14 mounted to revolve round drive rollers 15. These are driven, via a worm drive and gearbox (not shown), by a speed controlled electric motor (not shown). (The feed control means may be enclosed in a chamber which is maintained at any desired temperature.)

The tube next passes through an aperture 16 in a heater housing 17 mounted on an annular infra-red heater 18 surrounding the tube. An internal infra-red heater 19 (enclosed in a quartz cover which reduces convection inside the tube) is mounted on a tube 20 which in turn is mounted on the die 2. This internal heater 19 supplies heat to the inside of the tube. It is provided with a locator 21 mounted on the tube 20, which locator comprises a sand blasted and chromium plated brass cylinder having a passage through it for air supply from above it to where the bubble stretches (alternatively it could consist of an air bearing and a passage to equalise the pressure on either side of the locator as aforementioned). Thermal insulation is provided between the heater 19 and the tube 20. The electric leads (not shown) for the internal infra-red heater 19 are mounted inside the tube 20. The internal infra-red heater 19 may be continuously rotated during the operation of the apparatus so that non-uniform heating of the tube is reduced. Also to reduce non-uniform heating the internal heater may be mounted at a position somewhat lower than that shown in FIGURE 1 so that any effect caused by the internal heater being off centre is minimised.

The tube is now inflated as a result of being heated to the stretching or orienting temperature by the heaters 18 and 19. Further infra-red heaters 22 are provided (by raising them somewhat, they can be used to locate the draw point just below the heaters 18 and 19).

The inflated tube of film is finally collapsed by guide rollers 23 and flattened to prevent escape of the inflating air by nip rollers 24.

To reduce the effects of convection from the internal heater 16, the air between it and the locator 21 may be replaced continuously by supplying and removing air through the tube 20.

Figure 2:
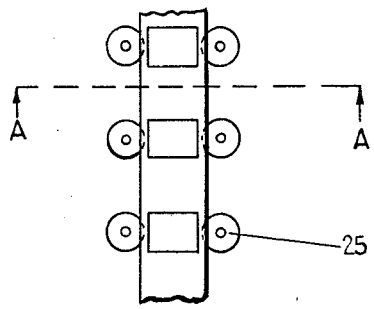
FIGURE 2 is a diagrammatic elevation of an alternative system of feeder-control means in which the means to drive the rollers and the mountings have been removed.
Figure 3:
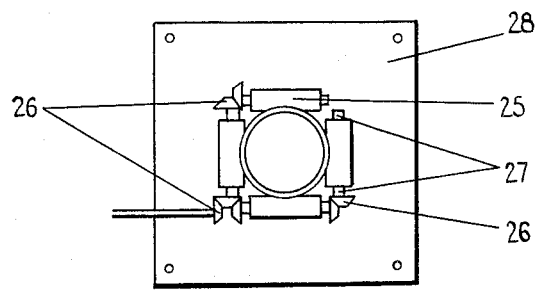
FIGURE 3 is a section along the line A—A of FIGURE 2 showing the means to drive the rollers and the mountings therefor.

In FIGURES 2 and 3 the endless belts are replaced by cylindrical foam rubber surfaced rollers 25 driven by bevel gears 26. The rollers 25 are mounted on mountings 27 attached to the support 28.

Figure 4:
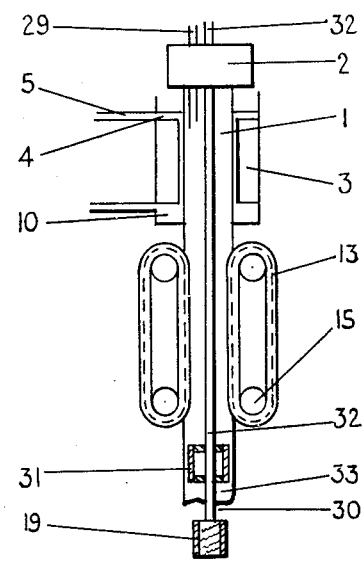
FIGURE 4 is a diagrammatic elevation of part of the system of FIGURE 1 showing an alternative arrangement for reducing the pressure difference inside and outside the tube near the die so that the molten tube is not unduly inflated or burst.

In FIGURE 4 (in which the reference figures correspond to those used in FIGURE 1) the space surrounding the tube 1 between the die 2 and sizing die 3 is open to the atmosphere and the interior of the tube near the die is maintained a little above atmospheric pressure to assist in sizing the tube, by means of a pipe 29 passing through the die. The inflation pressure present in the bubble at 30 is isolated from the pressure near the die by a baffle 31 (which is a sand blasted and chromium plated brass cylinder) attached to a tube 32 which is mounted on the die 2 and which carries the internal infra-red heater 19. Inflating pressure is supplied through the tube 32 via an aperture 33 leading to the part of the tube to be inflated. The electric leads (not shown) for the infra-red heater 19 are passed up the tube 32.

As an alternative to the use of a water lubricated sizing die, there may be used instead a sizing die whose inner surface has been sand blasted and chromium plated, which die is used dry. In this case the suck off device 10 may be present to the increase sizing pressure.

I have found that at high speeds of operation of the already described (prior art) processes, for instance at rates of tube extrusion above 10 ft. min. it is difficult to cool the inside surfaces of the melt extruded tube to any large extent. As a consequence, these inside surfaces of the tube when passed between the "take off nip rollers" tend to be heat sealed together. This is particularly likely to happen when the thermoplastic is melt extruded at high temperature (i.e. in the range 250–300° C.) as in the case of polyethylene terephthalate and isotactic polypropylene. Further, if it is desired to stretch the tube with a high stretch ratio, for instance, an isotactic polypropylene tube to an area stretch ratio of 40:1 to 100:1, thick-walled tubes may have to be stretched to obtain film more than, say 0.001 inch thick. When such thick-walled tubes are flattened by nip rollers they tend to crack at the crease and in addition it is difficult to cool their inside surfaces. The apparatus of this invention reduced these difficulties.

A further advantage of the invention arises from the lack of the creases made in the tube by "take off nip rolls." Such creases cause weaknesses in and may disfigure the stretched film. By following this invention layflat film can be obtained free from weaknesses due to such creasing in the "take off nip rolls," which layflat film may slit down one edge only and the tube opened out to a "flat film." In this way the size of the inflated tube of film may be halved for the same width of flat film produced (compared with the case in which layflat film is slit at both edges because weakness at the edges due to the creasing is caused by the "take off nip rollers").

The apparatus of the invention may be used to operate on any thermoplastic which is capable of being biaxially oriented. For instance, linear polyesters, e.g., polyglycol terephthalates such as polyethylene terephthalate and co-polyesters of isophthalic and terephthalic acids with a glycol; vinylidene chloride polymers and copolymers e.g. those containing 80–95% (by weight) vinylidene chloride and 20–5% acrylonitrile residues, and copolymers thereof with vinyl acetate or vinyl chloride; vinyl chloride; polyamides such as nylons; polystyrene and other polyolefines, particularly the highly crystallisable linear olefine polymers and copolymers (i.e. those which can have a degree of crystallinity above 50% as measured by X-ray diffraction), and more particularly such polymers wherein the olefin has between 2 and 6 carbon atoms in the molecule, e.g. linear polythene and polymers and copolymers of propylene which are at least 75% insoluble in boiling n-heptane such as isotactic polypropylene; cellulose esters; rubber hydrochloride; and such film forming proteins as are capable of biaxial orientation.

When the apparatus is used to operate on relatively thin or flexible tubes such as polyethylene terephthalate tubes, care should be taken to ensure that the tube is adequately gripped by the moving surfaces. The grip thereof may be improved by means of the inflating pressure within it or by providing an adequate length of moving surface.

In the operation of the apparatus described with reference to the drawings in which an internal infra-red heater is used, care should be taken not to apply too much heat from the inner heater particularly in the case of thick tubes, especially if the passage of the tube through the apparatus is relatively rapid, since the inner surface of the tube will under these conditions be hotter than the outside surface just before the tube enters the heaters (because it has been sized and cooled externally); the inner surface of the tube therefore requires considerably less heat to bring it to the optimum stretching temperature. The result of overheating is a high frequency of burst of the expanding tube.

I claim:

An apparatus for a tubular process of producing oriented thermoplastic film comprising: a die for the extrusion of a tube of thermoplastic material having within it a passage for the supply of an inflating gas to within the tube and associated with the die a means for preventing an inflation pressure from rupturing the tube, said die having a means to evaporate off from the tube any volatile liquid and to cool the tube mounted around the axis of the die but spaced axially from it, feed control means comprising at least two moving surfaces constructed to surround at least partially and grip the tube over part of its length without marring and distorting it, and a speed control operatively connected with the moving surfaces to control their speed so that the tube may positively be fed by the feed control means at a controlled rate, and mounted axially of the die and beyond the feed control means a means for hauling off the tube of film produced by the inflation of the tube while trapping the inflating gas within it; means, interposed between said feed control means and said hauling off means for essentially radiantly heating the tube of film to raise the temperature of said film to orientation temperature; wherein the means to prevent an inflation pressure from rupturing the tube comprises a baffle constructed so that it can be inserted into the tube at a position in the tube in advance of where it stretches, which baffle is constructed to form a seal with the tube and to isolate the inflation pressure from the pressure inside the tube near to the die, in combination with a pipe through which the inflation gas pressure in the region of the inflation may be adjusted.

References Cited by the Examiner

UNITED STATES PATENTS

| | | | |
|---|---|---|---|
| 1,612,509 | 12/1926 | Henderson et al. | 18—57 |
| 2,317,687 | 4/1943 | Larchar | 18—57 |
| 2,448,433 | 8/1948 | Irons et al. | 18—57 |
| 2,450,115 | 9/1948 | Byrnes | 65—192 |
| 2,634,459 | 4/1953 | Irons | 264—95 |
| 2,730,761 | 1/1956 | Castellan | 18—14 |
| 2,862,234 | 12/1958 | Gerber | 18—57 |
| 2,922,194 | 1/1960 | Lampard et al. | 18—57 |
| 2,961,711 | 11/1960 | Diedrich et al. | 18—57 |
| 2,966,700 | 1/1961 | Dyer et al. | 264—95 |
| 2,979,777 | 4/1961 | Goldman | 18—57 |
| 3,091,807 | 6/1963 | Turner et al. | 264—95 |
| 3,141,912 | 7/1964 | Goldman et al. | 264—95 |

FOREIGN PATENTS

| | | |
|---|---|---|
| 1,211,176 | 10/1959 | France. |
| 840,191 | 7/1960 | Great Britain. |

ALEXANDER H. BRODMERKEL, *Primary Examiner.*

MICHAEL V. BRINDISI, *Examiner.*